United States Patent [19]

Kaplan

[11] Patent Number: 5,006,023
[45] Date of Patent: Apr. 9, 1991

[54] STRIP-OUT PREVENTING ANCHORING ASSEMBLY AND METHOD OF ANCHORING

[76] Inventor: Stanley Kaplan, 160 Sequams La. West, West Islip, N.Y. 11788

[21] Appl. No.: 513,549

[22] Filed: Apr. 24, 1990

[51] Int. Cl.⁵ .............................................. F16B 13/04
[52] U.S. Cl. ...................................... 411/17; 411/438; 29/522.1
[58] Field of Search .................. 411/16, 17, 178, 182, 411/262, 438; 29/522.1, 523, 525.1

[56] References Cited

U.S. PATENT DOCUMENTS

| | | | |
|---|---|---|---|
| 4,309,135 | 1/1982 | Gutshall | 411/17 |
| 4,581,871 | 4/1986 | Blucher et al. | 411/438 |

FOREIGN PATENT DOCUMENTS

| | | | |
|---|---|---|---|
| 536820 | 4/1955 | Belgium | 411/17 |
| 21113 | 5/1930 | Netherlands | 411/17 |

*Primary Examiner*—Neill R. Wilson
*Attorney, Agent, or Firm*—Robert W. Fiddler

[57] ABSTRACT

An anchoring assembly and method for securing a threaded elongate member such as a bolt or screw in a material engaging position in a preformed hole in a relatively frangible material. The anchoring assembly is formed of a threaded elongate member and coil surrounding and engaging at least some of the threads of the elongate member and extend beyond the outer transverse boundary of the elongate member. The elongate member is formed with a reduced diameter preferably tapered entry end, a threaded body portion, and preferably a headed head end. The coil is formed of a uniform cross-section wire having a diameter permitting the coil to seat on the threaded body portion of the elongate member. An anchoring tab or tang having a thickness less than the diameter of the wire forming the coil is formed on at least one end of the coil with a thickness preferably between 90% and 110% of half the difference in diameter between the maximum outer diameter of the elongate threaded member and the outer diameter of the coil.

In use, the coil with the tang extending towards the head end of the threaded member is threaded over the entry end of the threaded member. A hole of a diameter between 95% of the outer diameter of the threaded member and 99% of the outer diameter of the coil is formed in the material in which the threaded member is to be secured and the assembled coil and threaded member are driven into the hole to a depth equal to the length of the threaded member minus the distance between the head of the threaded member and the top of the coil, after which torqueing the threaded member in the coil expands the coil and anchoring tang into the side walls of the hole.

20 Claims, 1 Drawing Sheet

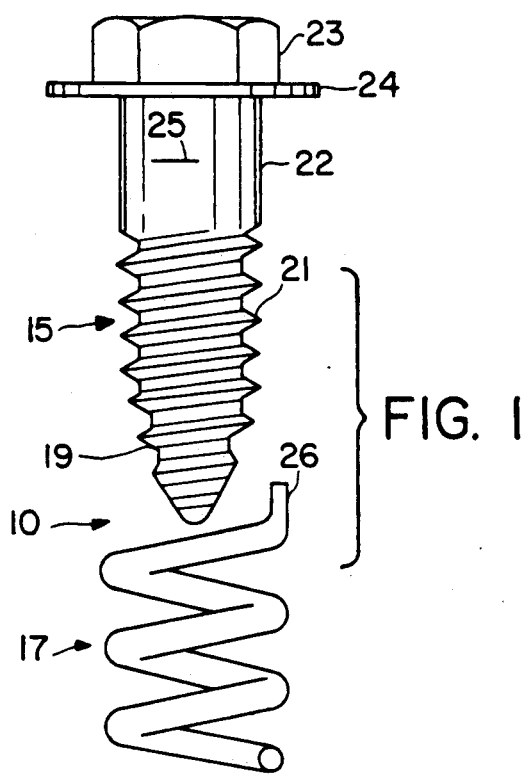
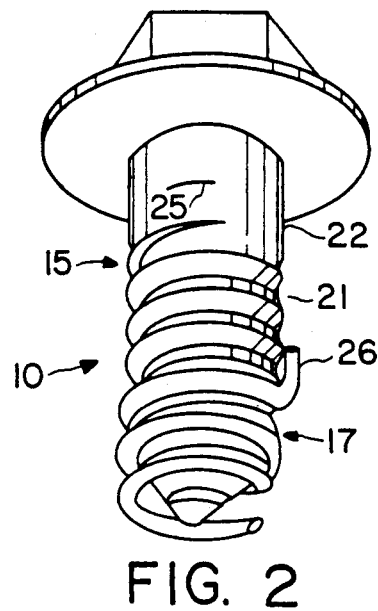
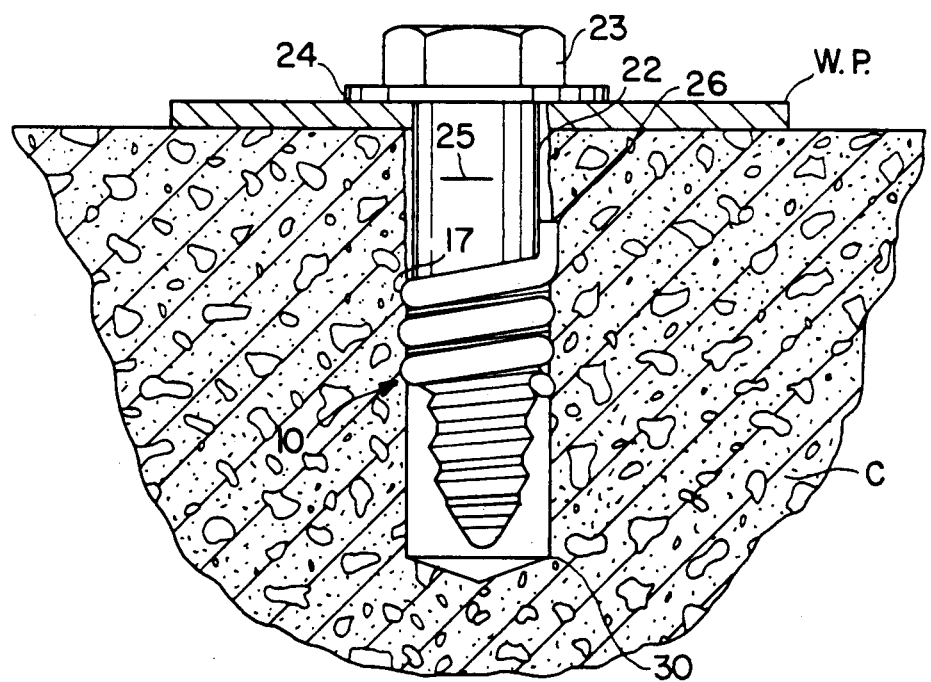

STRIP-OUT PREVENTING ANCHORING ASSEMBLY AND METHOD OF ANCHORING

This invention relates to an anchoring assembly and method of anchoring, and more particularly to an assembly and method for securing a threaded elongate member such as a bolt or screw in a frangible material such as concrete or cement so as to implement the fastening of a work piece to a concrete or cement surface.

BACKGROUND OF THE INVENTION

Anchoring assemblies for use in securing a threaded bolt or screw in a preformed opening in concrete or cement walls, piers, foundations or the like have been evolved in a variety of forms over the years. Among the most satisfactory of such prior anchoring assemblies are those employing a bolt or screw with an entry end of a smaller diameter than that of a threaded body portion of the bolt or screw. A coil is provided dimensioned to engage the threads of the bolt or screw, and having an exterior diameter larger than that of the bolt or screw when seated in the threads of the body portion of the bolt or screw. In use, the coil is positioned to engage the threads of the entry end of the threaded member or bolt, and the assembly is inserted into a pre-drilled hole of a diameter between the maximum diameter of the bolt and the maximum diameter of the coil. Thereafter, upon turning the threaded member, the coil will be expanded on the larger diameter body portion of the bolt to grip the concrete or cement of the hole to engage therein.

Anchoring assemblies of this type are disclosed in prior U.S. Pat. Nos. 806,406; 906,691; 1,199,624; 3,967,525; 4,309,135; and 4,536,115. All of these previously patented structures serve generally to employ the coil to provide a relatively smooth thread engaging surface within the frangible concrete material so that the threaded bolt or screw may be turned in thread engaging movement within the hole without damaging the frangible hole surface as would be the case with the coil not present.

However, in using these previously developed anchoring assemblies, it is often found that the turning or "torqueing" of the bolt or screw in the assembly as is necessary to affect expansion of the coil into engagement with the frangible side walls of the hole often produces rotation of the coil in the hole. This causes the hole diameter to be reamed, increasing its size so that it often no longer engages the coil. Further rotation of the bolt or screw produces what is referred to as "strip-out" of the assembly, with the entire assembly coming out of the hole.

Gutshall in U.S. Pat. No. 4,309,135 has attempted to solve the problem by providing tabs at the end of the coil formed of a thickness equal to that of the coil wire and extending axially inclined with respect to the coil to increase the frictional engagement between the coil and the hole inside surface to prevent rotation of the coil as the bolt is being torqued. In use, it has been found that this tab which is dimensioned of a thickness equal to that of the wire forming the coil becomes wedged between the outer diameter of the bolt and the hole inside surface occupying a diameter greater than the diameter of the coil which lies in the threaded portion of the bolt. As a result, in hammering the bolt into the hole, the tabs damage the hole wall surface, and any slippage between the coil and the hole, such as often occurs during torqueing of the bolt into the coil, acts to ream the hole to a diameter beyond the diameter of the coil, permitting undesired "strip-out" of the assembly.

SUMMARY OF THE INVENTION

It is with the above considerations in mind that the present improved anchoring assembly and method of anchoring have been evolved, serving to provide a concrete or cement anchor in which the anchoring assembly will not be subject to failure or "strip-out" as a result of the torqueing of the threaded bolt or screw in the coil positioned in a pre-drilled hole in the concrete or cement.

It is accordingly among the primary objects of this invention to provide an improved anchoring assembly and method for securing a threaded elongate member such as a bolt or screw in a pre-drilled hole in concrete or cement in which positioning of the assembly in the pre-drilled hole produces no reaming of the hole during insertion of the assembly, or removal of the threaded bolt or screw from the hole.

Another object of the invention is to provide an anchoring assembly of the bolt and the coil type in which torqueing of the bolt with respect to the coil after insertion of the assembly into a pre-drilled hole in concrete or the like will not produce rotation of the coil with respect to the inside surface of the hole.

It is also an object of the invention to provide a method for utilizing a coil to anchor a threaded member in a frangible material in which "strip-out" of the threaded member and coil will be eliminated.

These and other objects of the invention which will become hereafter apparent are achieved by forming a bolt-coil assembly in which a threaded member is combined with a coil. The coil is formed of a wire of a diameter such that it may engage in the threads of the threaded member, and the coil is dimensioned with an inner diameter engaging in the threads of the threaded member, and an outer diameter slightly larger than the outer diameter of the threaded member. The threaded member is formed with a threaded reduced diameter entry end, a threaded body portion, a preferably unthreaded body portion, and a driving end which may be headed or slotted to permit the application of a driving element such as a wrench or screwdriver to the threaded member to affect rotation or torqueing thereof. Extending from at least one end of the coil, preferably the end of the coil which extends towards the head end of the threaded member, is a flattened anchoring tab or tang. This anchoring tang extends at an angle to the axis of the wire forming the coil, and is of a thickness less than the thickness of the wire forming the coil and dimensioned so as to extend a distance from the exterior surface of the major diameter of the bolt to the outer diameter of the coil when expanded in the hole.

A feature of the invention resides in the fact that by providing this flattened anchoring tab at the end of the coil, which has a thickness such that it does not extend beyond the outer diameter of the expanded coil at least until the screw or bolt is in its final desired seated position in the hole, when positioning the assembled bolt and coil in the pre-drilled hole, the torqueing of the assembly does not produce reaming of the hole, so as to produce "strip-out."

The specific details of a preferred embodiment of the invention and of the manner and process of making and using it so as to enable those skilled in the art to practice the invention will be described in full, clear, concise and exact terms in connection with accompanying drawing, wherein:

FIG. 1 is an exploded view of the anchoring assembly showing the threaded member and coil of which it is comprised;

FIG. 2 is a perspective view of the anchoring assembly showing the coil in position on the reduced diameter entry end of the threaded member;

FIG. 3 is a view through a preformed hole in a frangible material such as concrete, showing the anchoring assembly operatively positioned therein to show a workpiece secured to the concrete by means of the anchoring assembly;

FIG. 4 is a transverse cross-section through the tang showing a rectangular shape thereof;

FIG. 5 is a transverse cross-sectional view showing a tang formed with semicircular cross-section; and FIG. 6 is transverse cross-section through a tang formed with an oval cross-section.

DESCRIPTION OF A PREFERRED EMBODIMENT

As illustratively shown in the drawings, the anchoring assembly 10 as best seen in FIGS. 1-3 comprises an elongate threaded member 15 and coil 17.

The threaded member 15 is illustratively shown as a lag bolt or lag screw, but may obviously be formed of a variety of different elongate threaded members such as bolts, screws and the like. The elongate threaded member 15 is formed with a threaded reduced diameter entry end 19, a full diameter threaded body portion 21 of a larger external diameter than the diameter of the entry end 19, and in this case an unthreaded body portion 22, which is preferably formed of a diameter equal to between 100% and 110% of the diameter of the threaded body portion 21. The pitch between the threads formed on the entry end 19 and the body portion 21 are preferably the same for a purpose which will become hereafter apparent. In the illustrated embodiment, the head end of the threaded member 15 illustratively shown as a lag bolt is provided with a hex head 23 and an integral washer flange 24. Depth indicia 25 are formed on the threaded member, in this case by a line on the unthreaded body portion between the threaded body portion 21 and head end 23. The end of the threaded portion may also serve as the depth indicia.

The coil 17, as best seen in FIG. 1, is formed of a wire having a diameter such that it may be seated between the threads of the elongate member 15. The wire is preferably circular in cross-section, though other contours may be employed. In the illustrated embodiment, the coil 17 is provided with a tang 26 which is formed by flattening the wire at at least one end of the coil and bending this flattened end to extend at an angle to the axis of the wire of the last coil wind. In the illustrated embodiment, the tang 26 is shown extending parallel to the axis of the coil 17 and bolt 15. However, though this will provide maximum locking of the coil in the hole against torqueing, the locking tab or tang 26 may operate effectively when extending at an angle from 5° to 175° to the axis of the wire of the last coil wind. The cross-section of the tang 26 which is of a reduced thickness as compared to the diameter of the coil 17 may be either rectangular in cross-section as shown in FIG. 4; semicircular as shown in FIG. 5; oval as shown in FIG. 6; or any of a variety of other cross-sectional shapes, the important thing being that the tang have a thickness when measured in a plane transverse to the coil axis which is less than the diameter of the wire forming the coil. The preferred thickness of the tang is such as to extend from the outer surface of the threaded member 15 to the outer diameter of the coil 17 so that when the assembled coil and threaded member are being driven into a hole, the tang 15 will not require any increased volume in the hole.

A range of tang thickness between 90% and 110% of one half the difference in diameter between the outer diameter of the coil and the maximum outer diameter of the threaded member is found satisfactory to attain desired results. Ideally, as noted, the tang should be of a thickness such that it is embedded in the hole wall when the coil is driven into the hole to a desired depth, and then locked in position as the threaded member is torqued into the coil to a final seated position. This can best be accomplished by providing the threaded member with a portion having a diameter at the point of desired locking of tang 26 which is slightly larger than the other diameters of the threaded member. Thus, in the illustrated embodiment, the unthreaded portion 22, as illustratively shown in FIG. 3, is formed with a diameter slightly greater than the maximum diameter of the threaded portion 21 of the threaded member 15. Where the threaded member 15 is formed with only a threaded portion, or the tang 26 is firmly seated along a threaded portion, the threaded portion should have a slightly larger diameter than any other body portion of the threaded member.

Though a single tang 26 has been shown only at one end of the coil 17, it will be apparent to those skilled in the art that axially extending tangs may be formed at both ends of the coil, or a plurality of such tangs may be employed.

OPERATION

In use, the threaded member is formed by any of the conventional techniques employed for forming an elongate threaded member employing automatic screw machines, heading machines, extrusion, casting, stamping or the myriad of other available techniques for forming such threaded members.

The coil is formed by winding or forming a wire of a thickness such that it will lie in the threads of the threaded member, and provide an outer diameter which is greater than the outer diameter of the threaded member. The reduced thickness tang is similarly formed by any of a variety of metal working techniques.

As is apparent to those skilled in the art, there may be a possibility of forming the threaded member 15 and coil 17 of plastics within the scope of the invention. Further, plastics may be employed to coat either or both the coil and threads to protect and lubricate.

The coil 17 is arranged over the relatively small diameter entry end of the threaded member 15 as shown in FIG. 2, with the tang 26 shown as extending towards the head end of threaded member 15, and with the tang 26 and at least one loop of the coil engaging the maximum diameter threads of the body portion 21.

When it is desired to employ the anchoring member to secure a workpiece W.P. such as a plate or the like in a frangible material such as concrete C as illustrated in FIG. 3, a hole 30 is pre-drilled in the concrete. The hole is formed with a diameter less than the maximum diameter of coil 17, and equal to or slightly greater than the maximum diameter of the fully expanded threaded member, insuring wedging of the tang 26, preferably only when the threaded member has been torqued to a desired depth in the hole.

The length of the hole is such as to accomodate the threaded member when seated in operative position retaining the workpiece W.P. in position with respect to the concrete C.

The assembled coil and threaded member as shown in FIG. 2 are then axially driven into the pre-drilled hole 30 to a depth such that upon torqueing of the threaded member, the coil 17 will be fully expanded on threaded body portion 21. The desired depth of insertion of the assembled coil and threaded member may be indicated by indicia 25 on the body portion of the threaded member, which in this case is shown as a line 25 on the unthreaded body portion 22.

In assembling the coil on the threaded member 15 as seen in FIG. 2, the tang 26 will lie at least over a section of the body portion of the threaded member so that when the coil-threaded member assembly 10 is inserted into the hole, there will be frictional engagement between the coil and side walls of the hole.

Thereafter, upon rotation of the threaded member by engaging the hex head 23 thereof, the threaded member will be screwed into the coil so that the maximum diameter of the threaded body portion 21 will move into the coil expanding the coil to its maximum diameter, causing the outer edges of the coil to move into the side walls of the hole 30 which were formed with a diameter less than the maximum diameter of the coil to provide a locking action.

Any tendency of the coil to rotate as the threaded member is torqued will be resisted by the axially extending tang 26, which is of a thickness such as to engage in the side walls of the hole 30. However, the degree of engagement of tang 26 is not greater than the degree of engagement of the expanded coils 17, as seen in FIG. 3, so that there will be no tendency to ream the hole either during torqueing of the threaded member or during axial insertion of the threaded assembly.

The above disclosure has been given by way of illustration and elucidation, and not by way of limitation, and it is desired to protect all embodiments of the herein disclosed inventive concept within the scope of the appended claims.

What is claimed is:

1. An anchoring assembly for securing a threaded elongate member such as a bolt or screw in a material engaging position in a relatively frangible material such as concrete, cement or the like, said assembly comprising:
    an elongate member having:
        an entry tip;
        a body portion;
        threads on at least a part of said body portion; and
        a head end;
    a coil formed of wire having a diameter such that the coil is engageable in the threads on said elongate member, said coil having an external diameter greater than the maximum diameter of said elongate member, and an internal diameter such that the wire forming the coil seats in the threads on said elongate member; and
    a tang on said coil extending at an angle to the axis of the wire forming an end wind of said coil from an end thereof, said tang having a thickness as measured in a direction transverse to said coil which is less than the diameter of the wire forming said coil, whereby the coil can be held against rotation as the elongate member is rotated in said coil to seat and retain the assembly in a hole in the frangible material in which the elongate member is to be secured.

2. An anchoring assembly as in claim 1 in which said coil is of a length less than the length of said threaded member.

3. An anchoring assembly as in claim 1 in which said coil is positioned to extend only over less than the full length of the threaded part of said threaded member.

4. An anchoring assembly as in claim 2 in which said elongate member has an unthreaded portion between 100% and 110% of the maximum diameter of said body portion with threads.

5. An anchoring assembly as in claim 1 in which said entry tip is tapered.

6. An anchoring assembly as in claim 1 in which said tang is rectangular in cross-section.

7. An anchoring assembly as in claim 1 in which said tang has a rounded surface.

8. An anchoring assembly as in claim 1 in which said tang is oval in cross-section.

9. An anchoring assembly as in claim 1 in which said tang extends from the end of said coil toward said head end of said elongate member.

10. An anchoring assembly as in claim 1 having an unthreaded portion on said body portion of said elongate member adjacent said head end, said coil not extending over said unthreaded portion, said tang lying over said unthreaded portion.

11. An anchoring assembly as in claim 1 in which said body portion of said threaded member is provided with indicia indicating the depth to which said assembly is to be driven into a hole in the frangible material before threading of the elongate member into said coil to effect securement.

12. an anchoring assembly as in claim 1 in which said tang extends at an approximately right angle to the axis of the wire forming the last wind of the coil along a line parallel to the coil axis.

13. An anchoring assembly as in claim 1 in which said tang is formed on the end of the coil closest to the head end of said elongate member.

14. An anchoring assembly as in claim 1 in which said tang is equal in thickness to between 90% and 110% of half the difference in diameter between the maximum outer diameter of said coil and the maximum outer diameter of said threaded member.

15. A method of anchoring an elongate threaded member such as a bolt or screw having an entry tip, a threaded body portion and a head end in a frangible material such as concrete or cement, said method comprising the steps of:
    forming a coil of wire having a diameter such that the coil is engageable in the threads on the elongate member, with the coil having an outer diameter greater than the maximum outer diameter of the elongate member, and an inner diameter less than the outer diameter of the threaded portion of the elongate member;
    forming a tang on the coil extending at an angle to the axis of the wire forming an end wind of the coil at one end thereof, the tang having a thickness less than the thickness of the wire forming the coil;
    forming a hole in the frangible material in which the threaded member is to be anchored, the hole having a diameter greater than the maximum external diameter of the threaded member and less than the maximum external diameter of the coil;

positioning the coil on the threaded body portion of the threaded member;

inserting the assembled coil and threaded member in the hole; and rotating the threaded member in the coil.

16. A method of anchoring an elongate threaded member in a frangible material as in claim 15, in which the coil is positioned on the elongate member with the tang arranged to extend toward the head end of the elongate member.

17. A method as in claim 15 in which the coil is formed of a length less than the length of the elongate member.

18. A method as in claim 15 in which the tang is formed by flattening an end of the wire forming the coil and bending the end to extend axially of the coil.

19. A method as in claim 15 in which the body portion of the threaded elongate member is formed with indicia indicating the desired depth to which the assembled coil and threaded member are to be, inserted into the hole in the frangible material prior to further rotation of the threaded member into the coil.

20. A method as in claim 15 in which the coil is positioned to extend over less than the full length of the elongate member prior to insertion of the assembled coil and elongate member into the hole.

* * * * *